United States Patent
Shiina et al.

(10) Patent No.: US 8,021,727 B2
(45) Date of Patent: Sep. 20, 2011

(54) IN-MOLD MOLDING LABEL AND MOLDED PRODUCT USING THE SAME

(75) Inventors: Masaki Shiina, Ibaraki (JP); Kazuyuki Kimura, Ibaraki (JP); Takatoshi Nishizawa, Ibaraki (JP)

(73) Assignee: Yupo Corporation, Tokyo (JP)

( * ) Notice: Subject to any disclaimer, the term of this patent is extended or adjusted under 35 U.S.C. 154(b) by 941 days.

(21) Appl. No.: 11/909,878

(22) PCT Filed: Mar. 29, 2006

(86) PCT No.: PCT/JP2006/306554
§ 371 (c)(1),
(2), (4) Date: Sep. 27, 2007

(87) PCT Pub. No.: WO2006/106775
PCT Pub. Date: Oct. 12, 2006

(65) Prior Publication Data
US 2009/0291257 A1    Nov. 26, 2009

(30) Foreign Application Priority Data
Mar. 30, 2005    (JP) .................................. 2005-096646

(51) Int. Cl.
| | | |
|---|---|---|
| *B32B 1/02* | (2006.01) | |
| *B32B 3/10* | (2006.01) | |
| *B32B 27/00* | (2006.01) | |
| *B32B 27/06* | (2006.01) | |
| *B32B 27/08* | (2006.01) | |
| *B32B 27/32* | (2006.01) | |

(52) U.S. Cl. ................... 428/35.7; 428/36.6; 428/36.92; 428/131; 428/134; 428/137; 428/138; 428/411.1; 428/500

(58) Field of Classification Search ................. 428/34.1, 428/34.2, 35.7, 36.6, 36.7, 36.8, 36.92, 131, 428/134–138, 411.1, 500, 515, 516, 517, 428/519, 521, 523
See application file for complete search history.

(56) References Cited

U.S. PATENT DOCUMENTS

| | | | | | |
|---|---|---|---|---|---|
| 5,223,315 A | * | 6/1993 | Katsura et al. | ............ | 428/36.92 |
| 5,494,735 A | * | 2/1996 | Nitta | ............................. | 428/207 |
| 6,561,610 B2 | * | 5/2003 | Yamasaki et al. | ............... | 347/15 |

FOREIGN PATENT DOCUMENTS

| | | |
|---|---|---|
| JP | 58-69015 | 4/1983 |
| JP | 1-125225 | 5/1989 |
| JP | 2-7814 | 2/1990 |
| JP | 2-84319 | 3/1990 |
| JP | 2001-30342 | 2/2001 |
| JP | 2001-48149 | 2/2001 |
| JP | 2001-353770 | 12/2001 |

* cited by examiner

Primary Examiner — Walter B Aughenbaugh
(74) Attorney, Agent, or Firm — Oblon, Spivak, McClelland, Maier & Neustadt, L.L.P.

(57) ABSTRACT

The invention provides a label for in-mold forming which tenaciously adheres to molded articles regardless of the materials of the molded articles, is usable under a wide range of molded-article molding conditions, and has an excellent print finish. The invention relates to: a label for in-mold forming, which comprises a resin film comprising a heat-sealable layer and a printing layer, wherein the heat-sealable layer has a rate of surface aperture of 6-30%, the printing layer has a dot skipping of 5% or lower, and the printing layer has a Bekk's surface smoothness (JIS-P-8119) of 650-20,000 seconds; and a molded article using the label.

15 Claims, No Drawings

US 8,021,727 B2

IN-MOLD MOLDING LABEL AND MOLDED PRODUCT USING THE SAME

CROSS-REFERENCE TO RELATED APPLICATIONS

This application is a 371 of PCT/JP2006/306554 filed Mar. 29, 2006 and claims the benefit of JP 2005-096646 filed Mar. 30, 2005.

TECHNICAL FIELD

The present invention relates to a label for in-mold forming which has an excellent print surface. The invention further relates to a labeled molded article bearing the label bonded thereto.

According to the invention, a label for in-mold forming is obtained which enables in-mold forming to be conducted so as to attain an excellent print surface finish and a highly fine print and which tenaciously adheres to molded articles regardless of the materials of the molded articles, can be bonded under a wide range of molded-article molding conditions, and imparts a satisfactory appearance to the molded articles produced by in-mold forming Furthermore, molded articles employing the label obtained according to the invention are disclosed.

BACKGROUND ART

In-mold forming has been known as a process for producing, by integral molding, a molded resin article bearing a label bonded thereto. This process comprises attaching a label to the inner wall of a mold beforehand, melting a molding resin, e.g., a polyethylene resin or polypropylene resin, directly feeding the molten resin into the mold, and molding the resin by injection molding, blow molding, pressure-difference molding, foam molding, or the like and simultaneously bonding the label thereto (see, for example, patent document 1 and patent document 2). Known labels for use in such in-mold forming include resin films printed by gravure printing, synthetic papers printed by multicolor offset printing (see, for example, patent document 3 and patent document 4), and aluminum labels obtained by laminating high-pressure-process low-density polyethylene, ethylene/vinyl acetate copolymer, or the like to the back side of an aluminum foil and printing the front side of the foil by gravure printing.

In the process in which those labels for in-mold forming are used to produce decorated labeled molded articles by in-mold forming, the labels employing high-pressure-process low-density polyethylene as a heat-sealable-layer resin show tenacious satisfactory adhesion to the molded articles when the material of the molded articles is high-density polyethylene. However, these labels have had a drawback that when the molded articles are made of other materials such as, e.g., polypropylene and polystyrene, adhesion between the labels and the molded articles is low and the labels peel off the molded articles during transportation. For attaining tenacious label adhesion to molded articles, it is necessary that labels for respective molded articles should be prepared in which the heat-sealable layers are made of the same kinds of resins as the corresponding molded articles. This has posed a problem that label stock management is complicated. The following problem also has been pointed out. Since low molding temperatures in molded-article production result in an insufficient adhesion strength between each molded article and the label, it is necessary to set the molding temperature high in molded-article production. Consequently, molding temperatures in molded-article production are considerably limited, resulting in a decrease in productivity.

Furthermore, there has been a problem that in the case where a label is printed, e.g., by gravure printing to form dots on the surface of the printing layer, many ink transfer failures occur when the surface of the printing layer is too rough, resulting in a considerably impaired print appearance.

Patent Document 1: JP-A-58-069015
Patent Document 2: JP-A-01-125225
Patent Document 3: JP-B-02-007814
Patent Document 4: JP-A-02-084319

DISCLOSURE OF THE INVENTION

Problems that the Invention is to Solve

An object of the invention is to provide a label for in-mold forming which tenaciously adheres to molded articles regardless of the materials of the molded articles, is usable under a wide range of molded-article molding conditions, and has an excellent print finish.

Means for Solving the Problems

The present inventors made intensive investigations in view of the problems described above. As a result, they have found that when a label has a heat-sealable layer having a porous surface with a specific rate of surface aperture and further has a printing layer having a smooth surface which has a dot skipping not higher than a specific value in dot printing, then the following effects are obtained. The heat-sealable layer produces an anchoring effect in which a molded-article resin penetrates into surface openings in the heat-sealable layer due to the pressure during molding and, hence, tenacious adhesion is attained between the label and the molded article regardless of the material of the molded article. In addition, this label can be bonded under a wide range of molding conditions in molded-article production. Furthermore, the printing layer enables an excellent print finish. The invention has been completed based on this finding.

Namely, the invention has the following constitutions.
(1) A label for in-mold forming, which comprises a resin film comprising a heat-sealable layer and a printing layer, wherein the heat-sealable layer has a rate of surface aperture of 6-30%, the printing layer has a dot skipping of 5% or lower, and the printing layer has a Bekk's surface smoothness (JIS-P-8119) of 650-20,000 seconds.
(2) The label for in-mold forming as described under (1) above, wherein the heat-sealable layer has an air permeability (JIS-P-8117) of 20,000 seconds or less.
(3) The label for in-mold forming as described under (1) or (2) above, wherein the heat-sealable layer comprises a thermoplastic resin (A) and at least one of an inorganic fine powder (B) and an organic filler (B').
(4) The label for in-mold forming as described under (3) above, wherein the thermoplastic resin (A) is a crystalline polyolefin resin.
(5) The label for in-mold forming as described under any one of (1) to (4) above wherein the heat-sealable layer has been stretched at least uniaxially and has an areal stretch ratio of 2-80.
(6) The label for in-mold forming as described under any one of (3) to (5) above, wherein the heat-sealable layer contains at least one of the inorganic fine powder (B) and the organic filler (B') in an amount of 50-80%, contains a polypropylene resin as the thermoplastic resin (A), and has been stretched at a stretch temperature lower by 1-60° C. than a melting point of the polypropylene resin.

(7) The label for in-mold forming as described under any one of (1) to (6) above, wherein the printing layer comprises a polypropylene resin and a polyethylene resin and the proportion by weight of the polypropylene resin to the polyethylene resin is from 4/6 to 6/4.

(8) A molded article comprising the label for in-mold forming as described under any one of (1) to (7) above.

(9) The molded article as described under (8) above which has been molded by direct blow molding, stretch blow molding, or injection molding.

(10) The molded article as described under (8) or (9) above, which comprises at least one thermoplastic resin selected from the group consisting of polypropylene resins, polyethylene resins, polystyrene resins, poly(ethylene terephthalate) resins, polyamide resins, ABS resins, and poly(vinyl chloride) resins.

ADVANTAGES OF THE INVENTION

According to the invention, a label for in-mold forming was obtained which enabled in-mold forming to be conducted so as to attain an excellent print surface finish and a highly fine print and which tenaciously adhered to molded articles regardless of the materials of the molded articles, could be bonded under a wide range of molded-article molding conditions, and imparted a satisfactory appearance to the molded articles produced by in-mold forming. Furthermore, molded articles employing this label were obtained according to the invention.

BEST MODE FOR CARRYING OUT THE INVENTION

The label for in-mold forming of the invention will be explained in more detail.

Heat-Sealable Layer

[1] Thermoplastic Resin (A)

Examples of the thermoplastic resin material for use in the heat-sealable layer in the invention include films of crystalline polyolefin resins such as polypropylene resins, high-density polyethylene, medium-density polyethylene, and linear low-density polyethylene, crystalline polyolefin resins such as ethylene/vinyl acetate copolymers, ethylene/acrylic acid copolymers, ethylene/alkyl acrylate copolymers, ethylene/alkyl methacrylate copolymers (each alkyl group has 1-8 carbon atoms), metal salts of ethylene/methacrylic acid copolymers, poly(4-methyl-1-pentene), and ethylene/cycloolefin copolymers, poly(ethylene terephthalate) resins, poly(vinyl chloride) resins, polyamide resins such as nylon-6, nylon-6,6, nylon-6,10, and nylon-6,12, ABS resins, and ionomer resins. Preferred are thermoplastic resins having a melting point in the range of 130-280° C., such as polypropylene resins, high-density polyethylene, and poly(ethylene terephthalate) resins. A mixture of two or more of these resins may be used.

From the standpoints of chemical resistance, production cost, etc., it is preferred to use a crystalline polyolefin resin. It is more preferred to use a polypropylene resin or high-density polyethylene. The crystalline polyolefin resin, has a crystallinity of generally preferably 20% or higher, more preferably 35-75%. Use of a crystalline resin is preferred because voids (openings) are sufficiently formed in the surface of a resin film by stretching. The crystallinity can be determined by a technique such as X-ray diffractometry or infrared spectroscopy.

As the polypropylene resin, it is preferred to use an isotactic polymer or syndiotactic polymer obtained by the homopolymerization of propylene. A copolymer containing propylene units as the main component may also be used which has been obtained by the copolymerization of one or more α-olefins, such as ethylene, 1-butene, 1-hexene, 1-heptene, and 4-methyl-1-pentene, and propylene and has any of various kinds of stereoregularity. This copolymer may be a bipolymer or a copolymer of three or more monomers, and may be a random copolymer or a block copolymer.

The content of the thermoplastic resin (A) in the heat-sealable layer in the invention is generally 20-50% by weight, preferably 25-50% by weight, especially preferably 35-50% by weight. In case where the content of the thermoplastic resin (A) exceeds 50% by weight, there is a tendency that the desired rate of surface aperture is not obtained and this results in an insufficient improvement in adhesion between the molded article and the label in in-mold forming. Conversely, in case where the content of the thermoplastic resin (A) is lower than 20% by weight, stretching tends to be difficult.

[2] Inorganic Fine Powder (B) and Organic Filler (B')

The inorganic fine powder and/or organic filler for use in the heat-sealable layer in the invention is not particularly limited. Examples of the inorganic fine powder include heavy calcium carbonate, lightweight calcium carbonate, calcined clay, talc, barium sulfate, diatomaceous earth, magnesium oxide, zinc oxide, titanium oxide, and silicon oxide. These powdery materials may have undergone a surface treatment with, e.g., a fatty acid. Of these, heavy calcium carbonate, calcined clay, and talc are preferred because they are inexpensive and bring about satisfactory moldability.

Examples of the organic filler (B') include ones having a melting point of 120-300° C. or a glass transition temperature of 120-280° C., such as poly(ethylene terephthalate), poly(butylene terephthalate), polyamides, polycarbonates, poly(ethylene naphthalate), polystyrene, melamine resins, poly(ethylene sulfite), polyimides, poly(ethyl ether ketone)s, polyetheretherketones, poly(phenylene sulfite), poly(4-methyl-1-pentene), poly(methyl methacrylate), homopolymers of cycloolefins, and copolymers of a cycloolefin and ethylene. One member selected from those inorganic fine powders and/or organic fillers may be used alone, or two or more thereof may be used in combination.

The content of the inorganic fine powder (B) and/or organic filler (B') in the heat-sealable layer in the invention is generally 50-80% by weight, preferably 50-75% by weight, especially preferably 50-65% by weight. In case where the content of (B) and/or (B') exceeds 80% by weight, stretching tends to be difficult. Conversely, in case where the content thereof is lower than 50% by weight, there is a tendency that the desired rate of surface aperture is not obtained and this results in an insufficient improvement in adhesion between the molded article and the label in in-mold forming.

[3] Dispersant (C)

A dispersant can be added to the heat-sealable layer in the invention according to need. Examples thereof include an acid-modified polyolefin and a silanol-modified polyolefin. Of these, it is preferred to use an acid-modified polyolefin. Examples of the acid-modified polyolefin include carboxylic-anhydride-group-containing polyolefins obtained by the random copolymerization or graft copolymerization of maleic anhydride; carboxy-group-containing polyolefins obtained by the random copolymerization or graft copolymerization of an unsaturated carboxylic acid such as methacrylic acid or acrylic acid; and epoxy-group-containing polyolefins obtained by the random copolymerization or graft copolymerization of glycidyl methacrylate. Specific examples thereof include polypropylenes modified with maleic anhydride, polyethylenes modified with maleic anhydride, polypropylenes modified with acrylic acid, ethylene/methacrylic acid random copolymers, ethylene/glycidyl methacrylate random copolymers, ethylene/glycidyl methacrylate graft copolymers, and polypropylenes modified with glycidyl methacrylate. Preferred of these are polypropylenes modified with maleic anhydride and polyethylenes modified with maleic anhydride.

Specific examples of the polypropylenes modified with maleic anhydride and polyethylenes modified with maleic anhydride include: Modic AP[P513V] (trade name) and Modic AP[M513] (trade name), manufactured by Mitsubishi Chemical Corp.; Yumex 1001 and 1010 (trade name) and Yumex 2000 (trade name), manufactured by Sanyo Chemical Industries, Ltd.; and HPR[VR101] (trade name), manufactured by Du Pont-Mitsui Polychemicals Co., Ltd.

The degree of acid modification of the acid-modified polyolefin is preferably 0.01-20%, more preferably 0.05-15%, even more preferably 0.1-10%. In case where the degree of acid modification thereof is lower than 0.01%, the effect of dispersing the surface-treated inorganic fine powder in the thermoplastic resin tends to be insufficient. In case where the degree of acid modification thereof exceeds 20%, such an acid-modified polyolefin tends to have too low a softening point and be difficult to be mixed with the thermoplastic resin.

Printing Layer

The printing layer in the invention preferably is a layer comprising a thermoplastic resin. The material of the printing layer is not particularly limited, and ingredients such as, e.g., the thermoplastic resin (A), inorganic fine powder (B) and/or organic filler (B'), and dispersant (C) described above under Heat-Sealable Layer can be mixed together in any desired proportion so as to form the desired smooth surface. In an especially preferred composition, a propylene homopolymer or propylene copolymer as a polypropylene resin and high-density polyethylene as a polyethylene resin are used in combination as the thermoplastic resin.

The proportion of the polypropylene resin, such as a propylene homopolymer or propylene copolymer, to the polyethylene resin, such as high-density polyethylene, is preferably from 4/6 to 6/4, more preferably 5/5. In case where the proportion of the propylene resin is too large, the printing layer tends to have too high a smoothness, resulting in poor abrasion resistance of prints. In case where the proportion of the polyethylene resin is too large, the printing layer has too low a smoothness and a dot skip failure is apt to occur.

When a dot pattern is printed on the printing layer in the invention, the printing layer has a dot skipping (the phenomenon in which part of the dots are not transferred to the printing layer) of 5% or lower, preferably 0-3%. Furthermore, the Bekk's surface smoothness (JIS-P-8119) of the printing layer is 650-20,000 seconds, preferably 700-5,000 seconds. In case where the Bekk's surface smoothness thereof is lower than 650 seconds, this printing layer, in the formation of a dot pattern by, e.g., gravure printing, has a dot skipping (the state in which part of the dots are not transferred to the printing side) exceeding 5% and has a considerably impaired print appearance to pose a practical problem. On the other hand, in case where the Bekk's surface smoothness exceeds 20,000 seconds, this printing layer tends to give a print having insufficient abrasion resistance and suffering ink shedding to pose a practical problem.

In the invention, the surface of the printing layer may be subjected to a heating/pressing treatment with a roll having a mirror surface or a satin-finished or otherwise processed surface, whereby the printing layer can be made to have the desired surface smoothness.

Optional Ingredients

Other known additives for resins can be added at will as optional ingredients to the resin film in the invention as long as the addition thereof does not adversely influence the desired heat sealability, printability, etc. Examples of the additives include slip agents such as fatty acid amides, antiblocking agents, dyes, plasticizers, release agents, antioxidants, flame retardants, and ultraviolet absorbers.

Core Layer and Interlayer

In the resin film in the invention, a core layer or an interlayer may be disposed between the heat-sealable layer and the printing layer from the standpoints of dimensional stability during printing, suitability of the label for feeding into molds, unsusceptibility to thermal shrinkage, etc. Examples of constitutions in this case include a printing layer/core layer/heat-sealable layer, a printing layer/core layer/interlayer/heat-sealable layer, and a printing layer/interlayer/core layer/interlayer/heat-sealable layer.

Overall Label Thickness

The overall thickness of the label which is the resin film of the invention is preferably 30-250 μm, more preferably 35-150 μm. Thicknesses thereof exceeding 250 μm are undesirable because the label having such a thickness tends to be too rigid and difficult to fix to a mold. On the other hand, in case where the thickness thereof is smaller than 25 μm, this label has too low rigidity and hence has a drawback that it has poor suitability for sheet-feed offset printing or poses a problem that it rumples in in-mold forming.

Production of Resin Film

The resin film for use as the label for in-mold forming of the invention can be produced by a combination of two or more of various techniques known to persons skilled in the art. Whatever methods the resin film was produced by, the resin film is within the scope of the invention as long as it satisfies the constituent requirements for the invention.

The resin film constituting the label for in-mold forming of the invention preferably is one which has been stretched at least uniaxially. It may have been biaxially stretched. For example, the resin film may be produced in the following manner. A crystalline polyolefin resin film containing an inorganic fine powder (B) in an amount of 0-40% by weight, preferably 3-33% by weight, is uniaxially stretched at a temperature lower than the melting point of the resin to obtain a uniaxially oriented resin film as a core layer. A molten film of a resin composition which comprises a resin composition composed of 20-50% by weight thermoplastic resin (A) and 80-50% by weight at least one of an inorganic fine powder (B) and an organic filler (B') and further contains a dispersant (C) in an amount of generally 0.01-100 parts by weight per 100 parts by weight of the sum of the thermoplastic resin (A) and the inorganic fine powder (B) and/or organic filler (B') is laminated as a heat-sealable layer to one side of the core layer. Furthermore, a crystalline polyolefin resin film comprising a thermoplastic resin (A) is laminated as a printing layer to that side of the core layer which is opposite to the heat-sealable layer. Subsequently, this laminated film is stretched in a direction perpendicular to the direction of that stretching. Thus, a resin film of a multilayer structure is obtained in which the outermost layers are oriented uniaxially in the transverse direction and the core layer is oriented biaxially. A preferred production process includes a step in which individual resin films are laminated and thereafter stretched together. Compared to the case where individual resin films are separately stretched and then laminated, that process is simple and attains a reduction in production cost.

Various known methods can be used for stretching.

Specific examples of stretching methods include stretching among rolls which utilizes peripheral-speed differences among rolls and clip stretching utilizing a tenter oven.

Stretching among rolls is preferred because a film having any desired rigidity, opacity, and gloss can be easily obtained by regulating stretch ratio at will. Stretch ratio is not particularly limited, and is determined while taking account of the intended use of the resin film according to the invention and the properties or the resins used. The stretch ratio is generally 2-11, preferably 3-10, more preferably 4-7.

In the case of clip stretching utilizing a tenter oven, the stretch ratio may be 4-11, and is preferably 5-10. The areal stretch ratio may be 2-80, and is preferably 3-60, more preferably 4-50. In case where the areal ratio is lower than 2, there is a tendency that the given rate of surface aperture is not imparted to the resin film surface and sufficient adhesion between the molded article and the label is not obtained in in-mold forming.

The heat-sealable layer in the label for in-mold forming of the invention may be formed in the following manner. A thermoplastic resin (A) is mixed with an inorganic fine powder (B) and/or an organic filler (B') in a given proportion, and this mixture is formed into a film by extrusion or another technique. Thereafter, this film is stretched uniaxially or biaxially at a temperature lower by 1-60° C., more preferably 3-55° C., than the melting point of the polypropylene resin as the thermoplastic resin (A) to thereby form voids using the inorganic fine powder (B) and/or organic filler (B') as nuclei.

Thus, a resin film is obtained which has fine voids in inner parts thereof and has a porous surface having fine cracks (surface aperture) therein.

In case where the stretch temperature for the heat-sealable layer exceeds the melting point of the polypropylene resin, the desired rate of surface aperture is not obtained, resulting in reduced adhesion to molded articles. Such stretch temperatures are hence undesirable.

The heat-sealable layer produced by the method described above, in the resin film according to the invention, has a rate of outermost-layer surface aperture as determined by the following method of 6-30%, preferably 7% to 29%. Rates of surface aperture thereof lower than 6% are undesirable because a sufficient anchoring effect is not obtained between the molded article and the label in in-mold forming, resulting in a reduced adhesion strength between the molded article and the label. On the other hand, in case where the rate of surface aperture exceeds 30%, this label has too low a surface strength and readily undergoes a surface material failure. Consequently, a high adhesion strength is not obtained, which poses a practical problem.

The areal stretch ratio of the heat-sealable layer may be 2-80, and is preferably 3-60, more preferably 4-50. In case where the areal stretch ratio thereof is lower than 2, there is a tendency that the resin film does not have the desired rate of surface aperture and sufficient adhesion is not obtained between the molded article and the label in in-mold forming.

The rate of surface aperture means the areal proportion of voids (aperture) in the surface region of the resin film according to the invention which has been examined with an electron microscope.

Specifically, the procedure is as follows. Arbitrary part is cut out of a resin film sample and attached to a sample table. Gold, gold-palladium, or the like is vapor-deposited on the examination side of the cut sample, and this sample is examined for surface aperture with an electron microscope (e.g., scanning electron microscope S-2400, manufactured by Hitachi, Ltd.) at any desired magnification suitable for the examination (e.g., magnification of 500-3,000 diameters). Furthermore, the area examined is, for example, photographed and the voids in the photograph are traced onto a tracing film. The void images on the tracing film are wholly painted. The drawing thus obtained is subjected to image analysis with an image analyzer (Type Luzex IID, manufactured by Nireco Corp.) The areal proportion of the voids is taken as the rate of surface aperture of the resin film.

The air permeability (JIS-P-8117) of the resin film layer constituting the heat-sealable layer in the label for in-mold forming of the invention is preferably 20,000 seconds or less, more preferably 15,000 seconds or less. In case where the air permeability thereof exceeds 20,000 seconds, the in-mold label for blow molding which employs this resin film layer cannot be expected to produce the blistering-diminishing effect based on air permeation.

Printing

It is preferred that the label for in-mold forming should be subjected to a surface processing such as a corona discharge treatment or flame/plasma treatment to thereby improve beforehand the printability of the surface of the printing layer to be printed. Printing may be conducted by gravure printing, offset printing (oil-based or UV), flexography, letterpress printing (UV), screen printing, ink-jet printing, electrophotographic printing, or the like to print a bar code, manufacturer's name, seller's name, character, trade name, usage, etc.

The label printed is separated by punching into labels of a necessary shape and dimensions. This label for in-mold forming is usually produced as a blank to be used for surrounding the side wall of a cup-shape molded article or as a label to be bonded to the front side and/or back side of a bottle-shape molded article in blow molding.

Molded Article

This label for in-mold forming may be used in the following manner. The label is placed on the inner surface of the bottom female half of a mold for pressure-difference molding so that the printed side of the label is in contact with the mold surface. The label is then fixed to the inner wall of the mold half by suction. Subsequently, a sheet of a molten resin as a molding material is led to over the bottom female half and molded by pressure-difference molding in an ordinary manner to form a labeled molded article which has the label integrally fusion-bonded to the outer wall of the molded article. Although the pressure-difference molding may be either vacuum forming or pressure forming, it is generally preferred to conduct pressure-difference molding comprising a combination of the two molding techniques and utilizing plug assisting.

The label for in-mold forming of the invention can be advantageously used in direct blow molding in which a parison of a molten resin is pressed against the inner wall of a mold by pressurized air, stretch blow molding in which a preform is used, or injection molding in which a molten resin is injected into a mold with an injection molding machine and cooled/solidified. In particular, the label for in-mold forming of the invention is suitable for use in direct blow molding and injection molding. In such production, the label is fixed in the mold and then united with the resin being molded. Because of this, the thus-produced molded article bearing the label united thereto is free from label deformation, has tenacious adhesion between the molded article and the label, and suffers no blistering. Thus, a molded article having a satisfactory appearance decorated with the label is obtained. Examples of the molded article include bottles and containers.

EXAMPLES

Features of the invention will be explained below in more detail by reference to Examples, Comparative Examples, and Test Examples.

The materials, use amounts, proportions, details of treatments, treatment procedures, etc. shown in the following Examples can be suitably modified as long as the modifications do not depart from the spirit of the invention. Consequently, the invention should not be construed as being limited to the following embodiments in any way. The materials to be used in the following Examples and Comparative Examples are summarized in Table 1. In the table, "MFR" means melt flow rate.

Property Determination Methods and Evaluation Methods

In the Examples and Comparative Examples, properties were determined and evaluated by the methods shown below.

Determination of Properties (i) Rate of Surface aperture: This property indicates the areal proportion of voids in that region of a resin film surface which has been examined with an electron microscope.

Specifically, the procedure is as follows. Arbitrary part is cut out of a resin film sample and attached to a sample table. Gold, gold-palladium, or the like is vapor-deposited on the examination side of the cut sample. This sample can be examined for surface aperture with an electron microscope (e.g., scanning electron microscope S-2400, manufactured by Hitachi, Ltd.) at any desired magnification suitable for the examination (e.g., magnification of 500-3,000 diameters). Furthermore, the area examined is, for example, photographed and the voids in the photograph are traced onto a tracing film. The void images on the tracing film are wholly painted. The drawing thus obtained is subjected to image analysis with an image analyzer (Type Luzex IID, manufactured by Nireco Corp.). The areal proportion of the voids was taken as the rate of surface aperture of the resin film.

(ii) Air Permeability: Measurement was made in accordance with JIS-P-8117.

(iii) Bekk's Surface Smoothness: Measurement was made in accordance with JIS-P-8119.

(iv) MFR: Measurement was made in accordance with JIS-K-7210.

Resin films according to the invention (Examples 1 to 7) and resin films for comparison (Comparative Examples 1 to 4) were produced by the following procedures. Table 1 shows the kinds of materials used in producing the rein films. Table 2 shows the amounts of the materials (wt %), stretching conditions, and thicknesses of the layers.

Example 1

The composition [a] described in Table 2 was melt-kneaded and extruded with an extruder set at 260° C. and then cooled to 70° C. with a cooler to obtain a single-layer unstretched sheet.

This unstretched sheet was heated to the stretch temperature (1) shown in Table 2 and then longitudinally stretched among rolls in a stretch ratio of 5 to obtain a longitudinally uniaxially stretched film. Subsequently, the composition [b] was melt-kneaded with an extruder set at 250° C. and laminated to one side of the longitudinally uniaxially stretched film. Thereafter, the composition [c] and the composition [d] were melt-kneaded at 250° C. with respective separate extruders and laminated to the side opposite to that laminating side so that the composition [d] faced outward. Thus, a laminate was obtained which was composed of composition [b]/composition [a]/composition [c]/composition [d] (printing layer/core layer/interlayer/heat-sealable layer). Furthermore, the laminate was subsequently heated to the stretch temperature (2) shown in Table 2 and stretched in the transverse direction with a tenter in a stretch ratio of 8. Thus, a resin film was obtained which was composed of four layers stretched uniaxially/biaxially/uniaxially/uniaxially.

Examples 2 to 5 and Comparative Example 1

Resin films were obtained in the same manner as in Example 1, except that the makeup of the composition [d] was changed to those shown in Table 2.

Examples 6 to 8

Resin films were obtained in the same manner as in Example 1, except that the makeup of the composition [b] was changed to those shown in Table 2.

Comparative Example 2

A resin film was obtained in the same manner as in Example 4, except that the stretch temperature (2) was changed to the temperature shown in Table 2.

Comparative Examples 3 and 4

Resin films were obtained in the same manner as in Example 1, except that the makeup of the composition [b] was changed to those shown in Table 2.

Printing: Each of the resin films produced above was cut into A4 size and that side of this label which was opposite to the side to be bonded to a molded article was subjected to printing with a gravure printing tester manufactured by Kumagai Riki Kogyo Co., Ltd. and employing a plate cylinder bearing a pattern having a dot percent of 10%. As an ink was used CSUP (trade name), manufactured by Dainichiseika Color & Chemicals Mfg. Co., Ltd. The following items were evaluated as printability.

Dot skipping: The number of dots, per 100 dots, where the ink had not been transferred to the printing layer was counted with a magnifying lens. Dot skipping was evaluated based on the following criteria.

A: 0-3 dots: Dot skipping cannot be visually recognized and the print is on a practically satisfactory level.

B: 4-5 dots: Conspicuous dot skipping is observed with the naked eye and the print is on a practically problematic level.

C: 6 or more dots: Dot skipping is considerably conspicuous and the print is on a practically problematic level.

Abrasion Resistance: Using a Gakushin type friction tester manufactured by Suga Test Instruments Co., Ltd., the printed surface was rubbed against itself 1,000 times under a load of 200 g. The printed surface after the rubbing was examined for ink shedding and evaluated based on the following criteria.

A: No ink shedding has occurred and the print is on a satisfactory level.

B: Ink shedding is observed and the print is on a practically problematic level.

C: Considerable ink shedding has occurred and the pattern is not seen. The print is on a practically unusable level.

Subsequently, each stretched resin film thus printed was punched to obtain labels for in-mold forming which had a width of 70 mm and a length of 90 mm.

In-Mold Forming:

1) An injection molding machine (NV50ST/clamping, 50 t; vertical arrangement type) manufactured by Niigata Engineering Co., Ltd. was used, and a split mold for injection molding for producing a platy molded article having a width of 130 mm, length of 150 mm, and thickness of 1 mm was used.

A label was fixed to the surface of the female mold attached to the lower fixed platen so that the printed side of the label was in contact with the mold. Subsequently, the split mold was closed. Thereafter, polypropylene ("Novatec PP, MA3, MFR 11 [230° C., 2.16-kg load]" manufactured by Japan Polypropylene Corp.) was injected into the mold through the gate part at a pressure of 745 kgf/cm² from an injection apparatus set at 230° C. The molten resin was cooled/solidified and, simultaneously therewith, the label was fusion-bonded thereto. Thereafter, the mold was opened to obtain a platy injection-molded PP article bearing the label.

2) Molding was conducted in the same manner as described above, except that the material of the molded article was changed to linear low-density polyethylene ("Novatec LL, UJ990, MFR 35 [190° C., 2.16-kg load]" manufactured by Japan Polyethylene Corp.) and the temperature of the injection apparatus was changed to two temperatures, i.e., 220° C. and 180° C. Thus, injection-molded PE articles bearing a label were obtained.

3) Furthermore, the same procedure was conducted, except that the material of the molded article was changed to polystyrene ("HIPS, 433, MFR 21 [200° C., 5-kg load]" manufactured by PS Japan Corp.) and the temperature of the injection apparatus was changed to 230° C. Thus, an injection-molded PS article bearing a label was obtained. 4) A direct blow molding machine (Type V-50) manufactured by PLACO Co., Ltd. was used, and an automatic label feeder manufactured by Pentel Co., Ltd. was used to fix a punched label for in-mold forming (width, 62 mm; length, 124 mm) to one of the two halves of a split mold for blow molding (capacity, 400 mL) using a vacuum so that the printed side was in contact with the mold. Thereafter, a parison of PET ("RD383; melting point, 235° C.; density, 1.40 g/cm³" manufactured by Japan Unipet Co., Ltd.) was melt-extruded at 250° C. Subsequently, the split mold was closed. Thereafter, pressurized air of 4.9 kg/cm² was supplied into the parison to expand the parison and bring it into intimate contact with the mold. Thus, the parison was formed into a container shape and fusion-bonded to the label for in-mold forming. Subsequently, the mold was cooled and then opened, and the poly (ethylene terephthalate) (PET) container bearing the label and produced by direct blow molding was taken out.

Label/Molded Article Adhesion Strength:

A strip having a width of 15 mm was cut out of the label bonded to each molded article produced above. The bonding strength between the label and the molded article was determined by conducting T-peeling with tensile tester "Autograph Type AGS-D", manufactured by Shimadzu Corp., at a pulling rate of 300 mm/min. Label usability was judged based on the following criteria.

A: The adhesion strength is 400 (g/15 mm) or higher. The adhesion is tenacious and the label is on a practically completely satisfactory level.

B: The adhesion strength is 200 to lower than 400 (g/15 mm). The adhesion is slightly weak. This label may peel off depending on the shape of the molded article and is on a practically slightly problematic level.

C: The adhesion strength is lower than 200 (g/15 mm). This label readily peels off and is hence on a practically problematic level.

The results of the tests are summarized in Table 3.

[Table 1]

TABLE 1

| Ingredient | Material name | Details |
|---|---|---|
| | propylene homopolymer (material 1) | [trade name FY4, manufactured by Japan Polypropylene Corp.] (MFR (230° C., 2.16-kg load) = 4 g/10 min) |
| | ethylene homopolymer (material 2) | [trade name Novatec HD:HJ580, manufactured by Japan Polyethylene Corp.] (MFR (190° C., 2.16-kg load) = 10 g/10 min) |
| | heavy calcium carbonate (material 3) | [trade name Softon 1800, manufactured by Shiraishi Calcium Kaisha, Ltd.] dry-process pulverized powder having an average particle diameter of 3.0 μm |
| | heavy calcium carbonate (material 4) | [trade name Caltex 7, manufactured by Maruo Calcium Co., Ltd.] dry-process pulverized powder having an average particle diameter of 1.1 μm |
| | maleic-acid-modified polypropylene (material 5) | [trade name Yumex 1001, manufactured by Sanyo Chemical Industries, Ltd.] degree of maleic acid modification, 5% |
| | propylene/ethylene random copolymer (material 6) | [trade name FG4, manufactured by Japan Polypropylene Corp.] (MFR (230° C., 2.16-kg load) = 7 g/10 min) |

[Table 2]

TABLE 2

| | | Composition [a] | | Composition [b] | | Composition [c] | | Composition [d] | | Stretching Stretch temperature |
|---|---|---|---|---|---|---|---|---|---|---|
| | | Material | Amount (wt %) | Material | Amount (wt %) | Material | Amount (wt %) | Material | Amount (wt %) | (1) (° C.) |
| Ex. 1 | | 1 | 80 | 1 | 50 | 1 | 55 | 1 | 15 | 140 |
| | | 2 | 10 | 2 | 50 | 3 | 45 | 2 | 24 | |
| | | 3 | 10 | | | | | 4 | 60 | |
| | | | | | | | | 5 | 1 | |
| Ex. 2 | | 1 | 80 | 1 | 50 | 1 | 55 | 1 | 39 | 140 |
| | | 2 | 10 | 2 | 50 | 3 | 45 | 4 | 60 | |
| | | 3 | 10 | | | | | 5 | 1 | |
| Ex. 3 | | 1 | 80 | 1 | 50 | 1 | 55 | 1 | 49 | 140 |
| | | 2 | 10 | 2 | 50 | 3 | 45 | 4 | 50 | |
| | | 3 | 10 | | | | | 5 | 1 | |
| Ex. 4 | | 1 | 80 | 1 | 50 | 1 | 55 | 1 | 50 | 140 |
| | | 2 | 10 | 2 | 50 | 3 | 45 | 4 | 50 | |
| | | 3 | 10 | | | | | | | |

TABLE 2-continued

| | | | | | | | | | |
|---|---|---|---|---|---|---|---|---|---|
| Ex. 5 | 1 | 80 | 1 | 50 | 1 | 55 | 1 | 30 | 140 |
| | 2 | 10 | 2 | 50 | 3 | 45 | 3 | 60 | |
| | 3 | 10 | | | | | 5 | 1 | |
| Ex. 6 | 1 | 80 | 1 | 40 | 1 | 55 | 1 | 15 | 140 |
| | 2 | 10 | 2 | 60 | 3 | 45 | 2 | 24 | |
| | 3 | 10 | | | | | 4 | 60 | |
| | | | | | | | 5 | 1 | |
| Ex. 7 | 1 | 80 | 1 | 60 | 1 | 55 | 1 | 15 | 140 |
| | 2 | 10 | 2 | 40 | 3 | 45 | 2 | 24 | |
| | 3 | 10 | | | | | 4 | 60 | |
| | | | | | | | 5 | 1 | |
| Ex. 8 | 1 | 80 | 2 | 40 | 1 | 55 | 1 | 15 | 140 |
| | 2 | 10 | 6 | 60 | 3 | 45 | 2 | 24 | |
| | 3 | 10 | | | | | 4 | 60 | |
| | | | | | | | 5 | 1 | |
| Com. Ex. 1 | 1 | 80 | 1 | 50 | 1 | 55 | 1 | 55 | 140 |
| | 2 | 10 | 2 | 50 | 3 | 45 | 4 | 45 | |
| | 3 | 10 | | | | | | | |
| Com. Ex. 2 | 1 | 80 | 1 | 50 | 1 | 55 | 1 | 50 | 140 |
| | 2 | 10 | 2 | 50 | 3 | 45 | 4 | 50 | |
| | 3 | 10 | | | | | | | |
| Com. Ex. 3 | 1 | 80 | 1 | 55 | 1 | 55 | 1 | 15 | 140 |
| | 2 | 10 | 3 | 45 | 3 | 45 | 2 | 24 | |
| | 3 | 10 | | | | | 4 | 60 | |
| | | | | | | | 5 | 1 | |
| Com. Ex. 4 | 1 | 80 | 1 | 100 | 1 | 55 | 1 | 15 | 140 |
| | 2 | 10 | | | 3 | 45 | 2 | 24 | |
| | 3 | 10 | | | | | 4 | 60 | |
| | | | | | | | 5 | 1 | |

| | Stretching | | | | | |
|---|---|---|---|---|---|---|
| | Stretch temperature (2) (°C.) | Layer constitution | Number of stretching axes | Thickness (μm) | Stretch ratio | Areal stretch ratio of composition [a] layer |
| Ex. 1 | 155 | 4 | [B] 1 | 20 | 5/8 | 40 |
| | | | [A] 2 | 40 | | |
| | | | [C] 1 | 15 | | |
| | | | [D] 1 | 5 | | |
| Ex. 2 | 155 | 4 | [B] 1 | 20 | 5/8 | 40 |
| | | | [A] 2 | 40 | | |
| | | | [C] 1 | 15 | | |
| | | | [D] 1 | 5 | | |
| Ex. 3 | 155 | 4 | [B] 1 | 20 | 5/8 | 40 |
| | | | [A] 2 | 40 | | |
| | | | [C] 1 | 15 | | |
| | | | [D] 1 | 5 | | |
| Ex. 4 | 155 | 4 | [B] 1 | 20 | 5/8 | 40 |
| | | | [A] 2 | 40 | | |
| | | | [C] 1 | 15 | | |
| | | | [D] 1 | 5 | | |
| Ex. 5 | 155 | 4 | [B] 1 | 20 | 5/8 | 40 |
| | | | [A] 2 | 40 | | |
| | | | [C] 1 | 15 | | |
| | | | [D] 1 | 5 | | |
| Ex. 6 | 155 | 4 | [B] 1 | 20 | 5/8 | 40 |
| | | | [A] 2 | 40 | | |
| | | | [C] 1 | 15 | | |
| | | | [D] 1 | 5 | | |
| Ex. 7 | 155 | 4 | [B] 1 | 20 | 5/8 | 40 |
| | | | [A] 2 | 40 | | |
| | | | [C] 1 | 15 | | |
| | | | [D] 1 | 5 | | |
| Ex. 8 | 155 | 4 | [B] 1 | 20 | 5/8 | 40 |
| | | | [A] 2 | 40 | | |
| | | | [C] 1 | 15 | | |
| | | | [D] 1 | 5 | | |
| Com. Ex. 1 | 155 | 4 | [B] 1 | 20 | 5/8 | 40 |
| | | | [A] 2 | 40 | | |
| | | | [C] 1 | 15 | | |
| | | | [D] 1 | 5 | | |
| Com. Ex. 2 | 170 | 4 | [B] 1 | 20 | 5/8 | 40 |
| | | | [A] 2 | 40 | | |
| | | | [C] 1 | 15 | | |
| | | | [D] 1 | 5 | | |

TABLE 2-continued

|  |  |  |  |  |  |  |
|---|---|---|---|---|---|---|
| Com. Ex. 3 | 155 | 4 | [B] 1<br>[A] 2<br>[C] 1<br>[D] 1 | 20<br>40<br>15<br>5 | 5/8 | 40 |
| Com. Ex. 4 | 155 | 4 | [B] 1<br>[A] 2<br>[C] 1<br>[D] 1 | 20<br>40<br>15<br>5 | 5/8 | 40 |

[Table 3]

TABLE 3

| | Printability | | | | Suitability for in-mold forming Molded article/label adhesion strength, g/15 mm | | | | |
|---|---|---|---|---|---|---|---|---|---|
| | Printing side property | Adhesion side propery | | Percentage of dot skipping | Abrasion resistance | Injection molding | | | Direct blow molding |
| | Surface smoothness (sec) | Rate of voids (%) | Air permeability (sec) | (ink transfer failure) | (ink adhesion) | PP molded article 230° C. injection | PE molded article 220° C. injection | 180° C. injection | PS molded article 230° C. injection | PET molded article parison, 250° C. |
| Ex. 1 | 1500 | 15 | 1600 | 1% A | A | 700 A | 650 A | 650 A | 480 A | 470 A |
| Ex. 2 | 1500 | 15.5 | 800 | 1% A | A | 700 A | 650 A | 620 A | 500 A | 520 A |
| Ex. 3 | 1500 | 7.5 | 5700 | 1% A | A | 580 A | 530 A | 440 A | 440 A | 430 A |
| Ex. 4 | 1500 | 6.5 | 7300 | 1% A | A | 520 A | 500 A | 420 A | 410 A | 420 A |
| Ex. 5 | 1500 | 16 | 700 | 1% A | A | 710 A | 670 A | 660 A | 520 A | 530 A |
| Ex. 6 | 1100 | 15 | 1600 | 3% A | A | 700 A | 650 A | 650 A | 480 A | 470 A |
| Ex. 7 | 2000 | 15 | 1600 | 1% A | A | 700 A | 650 A | 650 A | 500 A | 470 A |
| Ex. 8 | 1200 | 15 | 1600 | 2% A | A | 700 A | 640 A | 640 A | 590 A | 470 A |
| Com. Ex. 1 | 1500 | 5 | 30000 | 1% A | A | 380 B | 180 C | 140 C | 250 B | 180 C |
| Com. Ex. 2 | 1500 | 4 | ∞ | 1% A | A | 300 B | 290 B | 180 C | 80 C | 70 C |
| Com. Ex. 3 | 600 | 15 | 1600 | 6% C | A | 700 A | 650 A | 650 A | 480 A | 480 A |
| Com. Ex. 4 | 30000 | 15 | 1600 | 0% A | C | 700 A | 650 A | 620 A | 500 A | 470 A |

While the invention has been described in detail and with reference to specific embodiments thereof, it will be apparent to one skilled in the art that various changes and modifications can be made therein without departing from the spirit and scope thereof.

This application is based on a Japanese patent application filed on Mar. 30, 2005 (Application No. 2005-096646), the contents thereof being herein incorporated by reference.

INDUSTRIAL APPLICABILITY

According to the invention, a label for in-mold forming was obtained which enabled in-mold forming to be conducted so as to attain a highly fine print surface finish and impart a satisfactory appearance to the molded articles produced by the in-mold forming. Molded articles employing this label were also obtained.

The label of the invention is a label for use in in-mold forming in which a labeled molded article is produced by injection-molding a molten thermoplastic resin or subjecting a sheet of a molten thermoplastic resin to vacuum forming or air-pressure forming. It is suitable for use in industrial fields where resins are molded.

The invention claimed is:

1. A label for in-mold forming comprising a resin film comprising a heat-scalable layer and a printing layer, wherein the heat-sealable layer comprises an at least uniaxially stretched film which comprises a thermoplastic resin (A) and at least one of an inorganic powder (B) and an organic filler (B'), the heat-sealable layer has a rate of surface aperture of 6-30%, the printing layer has a dot skipping of 5% or lower, and the printing layer has a Bekk's surface smoothness of 650-20,000 seconds as measured according to JIS-P-8119.

2. The label for in-mold forming as claimed in claim 1, wherein the heat-sealable layer has an air permeability of 20,000 seconds or less as measured by JIS-P-8119.

3. The label for in-mold forming as claimed in claim 1, wherein the thermoplastic resin (A) is a crystalline polyolefin resin.

4. The label for in-mold forming as claimed in claim 1, wherein the heat-sealable layer has an areal stretch ratio of 2-80.

5. The label for in-mold forming as claimed in claim 1, wherein the heat-sealable layer comprises at least one of the inorganic powder (B) and the organic filler (B') in an amount of 50-80%, a polypropylene resin as the thermoplastic resin (A), and has been stretched at a stretch temperature lower by 1-60° C. than a melting point of the polypropylene resin.

6. The label for in-mold forming as claimed in claim 1, wherein the printing layer comprises a polypropylene resin and a polyethylene resin and the proportion by weight of the polypropylene resin to the polyethylene resin is from 4/6 to 6/4.

7. A molded article comprising the label for in-mold forming as claimed in claim 1.

8. The molded article as claimed in claim 7, wherein the molded article has been molded by direct blow molding, stretch blow molding, or injection molding.

9. The molded article as claimed in claim 7, comprising at least one thermoplastic resin selected from the group consisting of polypropylene resins, polyethylene resins, polystyrene resins, poly(ethylene terephthalate) resins, polyamide resins, ABS resins, and poly(vinyl chloride) resins.

10. The molded article as claimed in claim 8 comprising at least one thermoplastic resin selected from the group consisting of polypropylene resins, polyethylene resins, polystyrene resins, poly(ethylene terephthalate) resins, polyamide resins, ABS resins, and poly(vinyl chloride) resins.

11. A molded article comprising the label for in-mold forming as claimed in claim 2.

12. A molded article comprising the label for in-mold forming as claimed in claim 3.

13. A molded article comprising the label for in-mold forming as claimed in claim 4.

14. A molded article comprising the label for in-mold forming as claimed in claim 5.

15. A molded article comprising the label for in-mold forming as claimed in claim 6.

* * * * *